United States Patent [19]

Weismann et al.

[11] Patent Number: 4,601,359
[45] Date of Patent: Jul. 22, 1986

[54] PART TIME ON-DEMAND FOUR-WHEEL DRIVE VEHICLE TRANSAXLE WITH VISCOUS CLUTCH

[75] Inventors: Peter H. Weismann, Santa Ana, Calif.; Dugald Cameron, Grosse Pointe Woods, Mich.; Richard E. Eastman, Central Square, N.Y.

[73] Assignee: Chrysler Corporation, Highland Park, Mich.

[21] Appl. No.: 743,215

[22] Filed: Jun. 10, 1985

[51] Int. Cl.$^4$ .............................................. B60K 17/02
[52] U.S. Cl. .............................. 180/233; 74/665 GB; 74/705; 180/248; 192/56 F
[58] Field of Search ............... 180/248, 249, 250, 233, 180/247; 74/705, 700, 701, 665 GC, 665 GB; 192/56 F, 58 C, 85 CA, 111 B

[56] References Cited

U.S. PATENT DOCUMENTS

| 3,760,922 | 9/1973 | Rolt | 192/111 B |
| 4,031,780 | 6/1977 | Dolan | 192/58 C |
| 4,298,085 | 11/1981 | Moroto | 180/249 |
| 4,457,394 | 7/1984 | Suzuki | 180/248 |
| 4,476,953 | 10/1984 | Hiraiwa | 180/249 |
| 4,520,690 | 6/1985 | Dangel | 180/249 |
| 4,562,897 | 1/1986 | Renneker | 180/233 |

FOREIGN PATENT DOCUMENTS

| 1357106 | 6/1974 | United Kingdom | 180/233 |
| 2098148 | 11/1982 | United Kingdom | 180/249 |

Primary Examiner—John J. Love
Assistant Examiner—Everett G. Diederiks, Jr.
Attorney, Agent, or Firm—Edward P. Barthel

[57] ABSTRACT

A dual bevel gear differential transaxle assembly for a front transverse engine vehicle with front and rear pairs of road wheels providing a part time on-demand four-wheel drive system. Interaxle and front wheel bevel gear differentials are aligned on a transverse axis. The differentials are connected by a side gear shaft and inner and outer side gear sleeves concentric about the side gear shaft. The interaxle differential achieves front axle to rear axle differentiation while the front wheel differential provides differentiation for the front pair of road wheels. The dual differential transaxle assembly includes viscous fluid clutch means providing an automatic limited slip condition of the interaxle differential when there is a predetermined difference in speed or rpm between the front and rear pair of road wheels.

1 Claim, 3 Drawing Figures

PART TIME ON-DEMAND FOUR-WHEEL DRIVE VEHICLE TRANSAXLE WITH VISCOUS CLUTCH

BACKGROUND OF THE INVENTION

This invention relates to a front wheel transaxle for a part time on-demand four-wheel drive vehicle and, more particularly, to a dual differential viscous clutch assembly for such a vehicle transaxle.

Constant four-wheel drive vehicle systems having a front wheel transaxle are known in the art. An example of one such system is disclosed in U.S. Pat. No. 4,417,642 issued to Suzuki et al. on Nov. 29, 1983. The Suzuki patent describes a four-wheel drive transaxle incorporating a front to rear interaxle bevel gear differential and a planetary gear differential with a clutch lockout mechanism. The U.S. Pat. No. 3,400,777 issued to C. Hill on Sept. 10, 1968 relates to a three differential four-wheel drive system with a lockout clutch designed for a rear engine drive vehicle. The U.S. Pat. No. 4,476,953 issued to Hiraiwa on Oct. 16, 1984 for a Four-Wheel Vehicle Drive System discloses a transaxle mechanism with two connected bevel gear differentials. The Hiraiwa system requires an intermediate gear mechanism and jack shaft for transmitting driving power to the rear-wheel driveline.

SUMMARY OF THE INVENTION

In accordance with the present invention, a dual bevel gear differential assembly for a front wheel transaxle is adapted for installation in a vehicle providing a part time on-demand four-wheel drive system. The vehicle has a front mounted engine which extends transversely of the vehicle. A transmission, which also extends transversely of the vehicle, has its transverse input shaft drivingly connected to the crankshaft of the engine which is rotatable about an axis in a lateral or east-west direction of the vehicle. The transmission output shaft is parallel with its input shaft and is drivingly connected to the rotatable casing of a first front-wheel to rear-wheel or interaxle bevel gear differential. The interaxle differential has its case supported for rotation relative to the transaxle housing and provides differentiation between the front axle and the rear axle.

A second front-wheel to front-wheel or front wheel bevel gear differential has its case rotatively supported within the transaxle housing. An inner side gear sleeve surrounds the first side gear shaft and drivingly interconnects the interaxle differential outboard side gear with the rotatable casing of the front axle differential.

First and second coaxial front side gear shafts are drivingly interconnected to the left and right front wheels, respectively. The first front shaft has its lefthand end drivingly interconnected to the left front wheel while its righthand end extends through the center of the interaxle differential side gears and case for driven engagement with the inboard side gear of the front wheel differential. The second front shaft has its righthand end drivingly connected to the right front wheel while its lefthand end is drivingly connected to the outboard side gear of the front wheel differential.

An outer side gear sleeve surrounds the inner side gear sleeve and drivingly engages the interaxle differential inboard side gear to a crown gear mounted on the outer side gear sleeve. The crown gear is drivingly engaged with a mating cone gear on the front end of a longitudinal extending front axle to rear axle propeller shaft. A third rear axle differential is drivingly engaged by gear means on the rearward end of the propeller shaft.

Viscous clutch means are provided to automatically transfer torque between the inner and outer side gear sleeves. With this arrangement the dual differential assembly provides a continuous four-wheel drive system with the interaxle differential operative to differentially interconnect the front wheel and rear wheel differentials under normal driving conditions. However, upon both wheels of either the front or back set of road wheels encountering considerably less road friction than the remaining set of road wheels, the viscous clutch torque transmitting capability will proportionally increase tending to drive the side gears of the interaxle differential together thereby achieving a limited slip condition for the interaxle differential. The result is that an increased proportion of the torque will be supplied to the remaining set of road wheels.

A feature of this invention is to provide a dual bevel gear differential assembly incorporating a viscous fluid clutch for a front wheel-drive transaxle having a transversely aligned front engine.

Another feature of the invention is to incorporate a conventional vehicle front wheel drive transverse engine with a part time on demand four-wheel drive vehicle transaxle having a interaxle bevel gear differential which is operative in combination with a viscous clutch to split the drive torque into a first output component being transmitted through a front wheel bevel gear differential to the pair of front road wheels and a rear axle differential to a pair of rear road wheels in an automatic manner governed by the difference in road friction between the front and rear set of wheels.

Still another feature of the invention is to provide a part time on demand four-wheel drive transaxle assembly as set forth above which drivingly interconnects the front-wheel differential with the interaxle differential by means of three concentrically arranged drive members adopted for relative rotation about a common transverse axis. The three concentric members include a first innermost side gear shaft, an inner side gear sleeve and an outer side gear sleeve. The outer sleeve is provided with an expanded concentric drum portion which with the inner sleeve incorporate a viscous clutch therebetween which automatically controls interaxle differentiation in accordance with the difference in the road friction between the front and rear set of wheels.

BRIEF DESCRIPTION OF THE DRAWINGS

These and other features and advantages of the invention will appear from the following written description and the accompanying drawings in which.

DETAILED DESCRIPTION OF THE INVENTION

Figure 1:
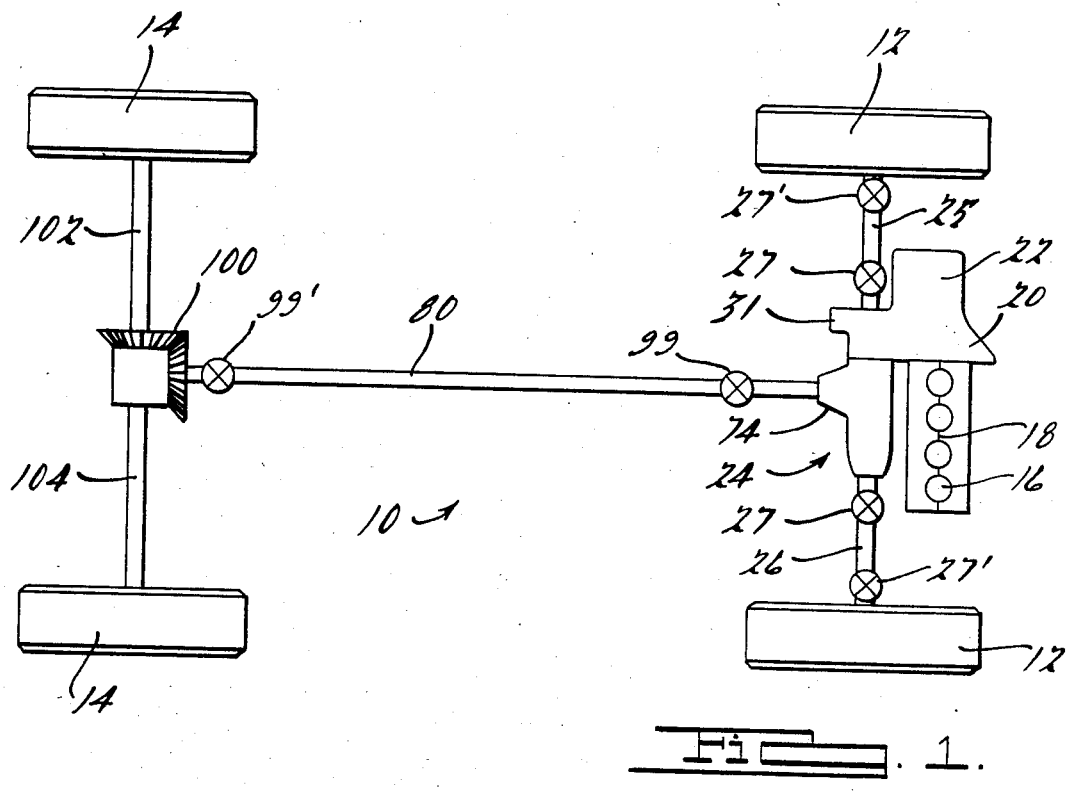
FIG. 1 is a schematic plan view of the arrangement of the constant four-wheel drive vehicle system incorporating the front transaxle assembly of the present invention.
Figure 2:
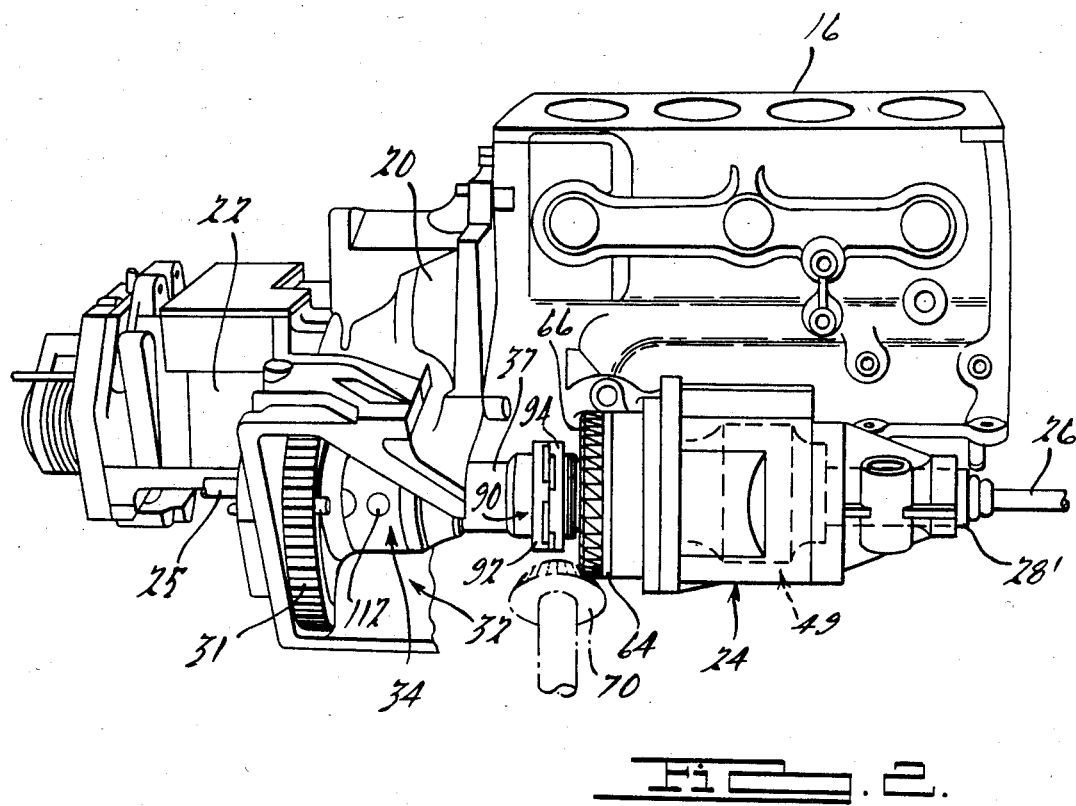
FIG. 2 is a fragmentary perspective view of the vehicle transverse engine and front transaxle with parts broken away.

FIG. 1 of the drawings diagrammatically discloses a layout of a motor vehicle drivetrain 10 with a transversely mounted front engine suited for use with the present invention. The vehicle has a pair of front drive wheels 12 and a pair of rear drive wheels 14 with the front engine 16 positioned crosswise between the two front wheels 12.

As seen in FIG. 1 the engine 16 has a transversely extending crankshaft 18 with its left-hand end splined to a clutch (not shown) in shell 20. The clutch is selectively connectable to an input shaft (not shown) of a transversely aligned manual or automatic transaxle power transmission unit 22. The transmission includes a change speed gearbox with an output transfer shaft 23 shown in FIG. 3. The arrangement of the transmission gearbox of the transaxle is conventional for front wheel drive vehicles. In the preferred embodiment the transaxle transmission unit 22 may be as shown and described in FIGS. 4-25 on page 73 of "Automotive Drive Trains" by F. Thiessen and D. Dales, published in 1984 by Reston Publishing Co. Inc. the disclosure of which is incorporated by reference herein.

The output from the gearbox is connected to a transaxle dual differential unit generally indicated at 24. The unit 24 is drivingly connected to left-hand and right-hand front wheel drive or half shafts 25 and 26 respectively. The driveshafts 25,26 are connected at their outer ends to front road wheels 12 through suitable coupling means such as constant-velocity universal joints 27 and homokinetic tripod joints 27' shown, for example, in U.S. Pat. No. 4,372,418 to Dangle issued Feb. 8, 1983.

Figure 3:
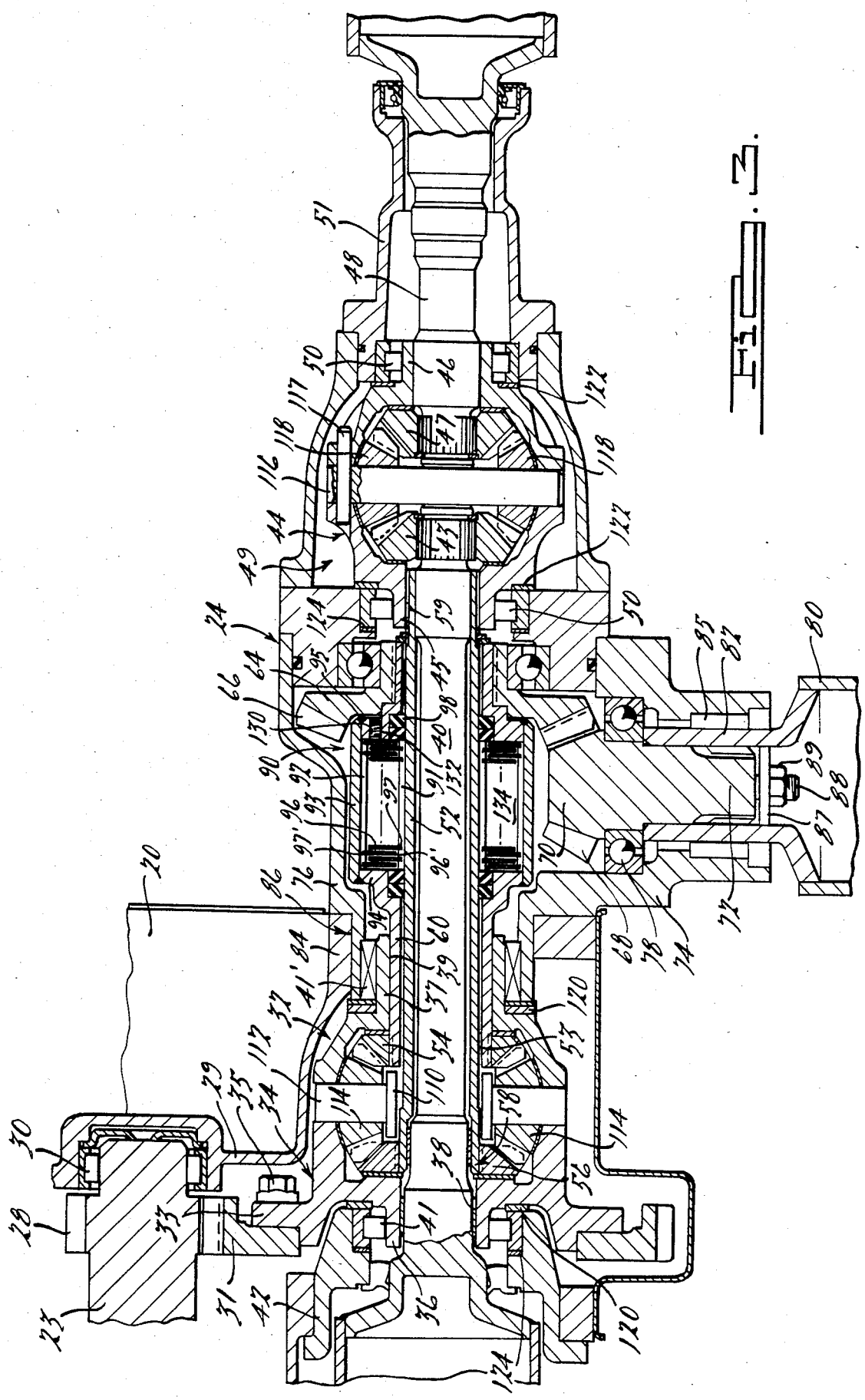
FIG. 3 is a fragmentary vertical sectional view of the dual differential assembly portion of the front transaxle.

As seen in FIG. 3 the transverse output transfer shaft 23 has an output pinion gear 28 positioned adjacent its inboard end. FIG. 3 shows the transfer shaft 23 having its inboard end rotatably journalled in a forwardly extending cup-shaped portion of transaxle housing 29 by roller bearings 30.

In the present invention the transfer shaft output gear 28 meshes with an input ring gear 31 of a first or front-to-rear torque splitting bevel gear interaxle differential 32 of the transaxle unit 22. The ring gear 31 is suitably mounted on a radial flange 33 of a first differential case 34 such as by a plurality of bolts 35. The differential case 34 has integral oppositely extending outboard 36 and inboard 37 axial extensions. The extensions 36,37 are formed with bores 38 and 39 respectively, aligned on a common transverse axis. The outboard extension 36 has its bore 38 provided with suitable bearings for journalled reception of first side gear shaft 40 therein. The differential casing outboard extension 36 is rotatably supported by constant diameter roller bearings 41 within left front transaxle drive wheel hub 42. The casing inboard extension 37 is rotatably supported by constant diameter roller bearings 41'.

The inboard end of the first side gear shaft 40 is splined in an internal axial bore of inboard bevel side gear 43. The side gear 43 is located in a diffferential case 44 of a second or front wheel to front wheel bevel gear differential generally indicated at 49. The case 44 has integral opposite inboard 45 and outboard 46 axial extensions aligned on the axis of the first differential extensions 36 and 37. Outboard bevel side gear 47 of the second differential is splined to the inboard end of a second side gear shaft 48. The first and second side gear shafts 40 and 48 are connected at their outer ends to the front wheel driveshafts 25 and 26 respectively, through suitable coupling means such as the constant velocity joints 27'.

It will be noted that the case 44 is a two-part casing joined by a plurality of bolts not shown. The particular arrangement of joining the casing portions is a matter of choice in design. The case could be bolted together, for example, in the manner of the first differential case 34 wherein the bolts are not shown. The second differential outboard extension 46 is rotatably supported by constant diameter roller bearings 50 within transaxle housing 51.

An inner side gear sleeve member 52 is shown in FIG. 3 rotatably mounted in a concentric manner about the first side gear shaft 40. The inner side gear sleeve member 52 has its left-hand end extending into the first differential case 34 through axial bore 53 in an outer sleeve and through inboard bevel side gear 54 for driving connection with outboard beveled side gear 56. As seen in FIG. 3 the inner sleeve member 52 has its left-hand end splined into internal bore 58 of the side gear 56. The inner side gear sleeve 52 has its other or right-hand end drivingly connected to second differential case 44. The inner sleeve 52 has a splined connection with bore 59 of the second differential inboard axial extension 45.

An outer side gear sleeve member 60 is shown in FIG. 3 rotatably mounted in a concentric manner on the inner side gear sleeve member 52 by suitable journal means for relative rotation therewith. The outer sleeve member 60 has its left-hand end journalled in the first differential inboard axial extension bore 39 for driving connection with the side gear 54. In the form shown the outer side gear sleeve 60 has its left-hand end beam splined the internal bore of the side gear 54. Suitable journal means are also provided for rotatably mounting the inboard axial extension 37 on the outer sleeve member 60 allowing for relative rotation therebetween.

The outer sleeve 60 is seen in FIG. 3 having its inboard or right-hand end connected to a crown or bevel gear 64. The crown gear 64 has beveled teeth 66 in meshing engagement with the beveled teeth 68 of input rear cone gear 70. The rear drive pinion 70 is shown with a stump trunnion portion 72 journalled within hollow cylindrical extension 74 of the transaxle housing portion 76 by ball bearings 78. A longitudinal front-to-rear propeller drive shaft 80 has a reduced tubular end 82 telescoped over trunnion portion 72. The tubular end 82 is journalled in extension 74 by roller bearings 85 and has a triped housing 87 secured to trunnion portion 72 by threaded bolt 88 and nut 89.

Front transaxle to rear axle viscous coupling means, indicated generally at 90 in FIG. 3, providing an automatic tendency to interlock of the input ring gear 31 with the crown gear 64 and the differential case 44 via the inner sleeve 52 and outer sleeve 60. Inner sleeve 52 has an external splined portion 91 aligned with internal splines 92 formed on the inner surface of outer cylindrical drum 93. The drum 93 is concentrically positioned outwardly from an intermediate portion of the outer sleeve by stepped end walls 94 and 95.

The sleeve external splines 91 mount a plurality of first viscous coupling plates 96. The plates 96 are annular ring-shaped members having splines 97 at their inner periphery which drivingly engage the sleeve external splines 91. The drum internal splines 92 mount a plurality of second viscous coupling plates 96'. The plates 96' are flat annular rings having splines 97' at their outer periphery which drivingly engage the drum internal splines 91. The plates 96 are interleaved with the plates 96' and float between the latter. Suitable seals 98, such as double lip seals, for example, are provided in internal notched portions of each end wall 94 and 95, respectively. The plates 96 and 96' shown herein may be similar to the plates shown in U.S. Pat. Nos. 3,760,922 and 4,031,780. It will be understood that plates with other configurations may be used. The operation of the viscous clutch coupling means 90 will be discussed in detail further on in the specification.

The cone gear 70 is connected to the propeller shaft 80 by universal joint means indicated at 99 in FIG. 1. The propeller drive shaft 80 is shown in FIG. 1 connected by universal joint means 99' to rear differential means, schematically indicated at 100. The rear differential means, preferably a bevel gear differential, is suitably connected to rear half shaft axles 102 and 104 providing conventional differential action between the two rear road wheels 14.

It will be noted that the interaxle bevel gear differential 32 has a spider pinion gear arrangement wherein a spider 110 supports a pair of diametrically opposed radial pinion stub shafts 112. Each stub shaft 112 rotatably supports within the casing means 34 a beveled pinion gear 114 which pinion gears meshes at opposite sides with the side gears 54 and 56. The front wheel bevel gear differential 49 has a single continuous pinion gear shaft 116 arranged at right angles to the axis of the case 44. A cross pin 117 is provided to locate the pinion gear shaft 116. The pinion gear shaft 116 rotatably supports a pair of beveled pinion gears 118 within the differential case 44. Each pinion gear 118 meshes at opposite sides with the pair of beveled side gears 43 and 47. It will be noted that needle thrust bearings 120 and 122 are provided for the differential cases 34 and 44 respectively, to absorb the axial thrust loads of the units. Also, suitable shims 124 are provided to axially position the dual differential unit. By virtue of the combination of constant diameter roller bearings 41, and 50 and the needle thrust bearings 120 and 122, the dual differential assembly may be axially aligned relative to the transaxle, by means of shims 124.

Returning now to the viscous clutch coupling means 90 it will be seen in FIG. 3 that the drum end wall 95 has an opening 130 closed by a threaded plug 132. The opening 130 is used for filling the viscous clutch chamber 134 formed by the sleeve 52 and the drum 93, and plates 96,96' with a predetermined quantity of viscous fluid. The fluid may be generally of the type shown in U.S. Pat. No. 3,760,922, for example, although other types of viscous fluids could be used. Similarly, while the plates 96,96' shown herein may be similar to the plates shown in U.S. Pat. No. 3,760,922, it will be understood that plates with other configurations may be used.

In the disclosed form the viscous clutch chamber is filled to a predetermined level less than its full capacity, i.e., 75 to 90% full, to allow for expansion by a silicone fluid having a relatively high viscosity. Preferably a silicone fluid having a viscosity ranging from 100,000 to 300,000 centistokes at 25° C. is used in chamber 134.

As explained in the above mentioned U.S. Pat. No. 4,031,780 differentiation between front and rear axles is required when the front wheels of the vehicle travel at a different distance than the rear wheel, such as may occur in cornering, for example. Also, varying tire radii, due to load distribution or tire pressure, require different axle speeds. If the conditions are such that different axle speeds are required between the front and rear axles the differential 32 will differentiate to accomplish this inter-axle function. That is, the viscous clutch coupling 90 normally allows the side gear 56 to rotate at a different speed than the side gear 54 to effect such different drive speeds to the front and rear axles, respectively.

As the side gear 56 rotates at a different speed than side gear 54, the plates 96 rotate relative to the plates 96'. During normal driving conditions, such as occurs in turning corners, for example, the torque transmitted by the shearing of viscous fluid in clutch 90 is minimal. The inner sleeve 52 is rotating at substantially the same speed and the viscous coupling clutch 90 has no effect. The temperature of the viscous fluid does not rise significantly during such operation.

Should conditions be such that, for example, both rear wheels 14 encounter a substance when the friction between the road and wheels 14 is considerably less than the front wheels 12, the differential 32 will tend to supply all the drive to the rear wheels 14. As the speed difference between the two side gears 56 and 54 increases, the torque transmitting capability of the viscous coupling 90 progressively increases due to the resistance to shearing of the viscous fluid between the plates 96 and 96'. Thus, the inner sleeve 52 and the drum 93, and consequently the gears 56 and 54 will tend to be driven together by the viscous coupling 90. That is the differential 32 will maintain a limited slip condition wherein there is a limited amount of differentiation between the front and rear axles. The above explanation will hold true in a converse situation wherein both front wheels 12 encounter a substance where the friction between the road and front wheels 12 is considerably less than the rear wheels 14.

It should be noted that the operation of the viscous clutch is the same when the vehicle is traveling in a reverse mode. Also, that upon any one wheel of either pair of wheels tending to slip its associated driving axle tends to over speed relative to the remaining axle the viscous coupling 90 will again function to limit the slippage of the interaxle differential and improve traction of the vehicle.

While the principles of the invention in connection with the specific apparatus has been described, it is to be understood that the foregoing detailed description has been made by way of example only and not as a limitation to the scope of the invention as set forth in the accompanying claims.

What is claimed is:

1. A dual differential part time on-demand four-wheel drive assembly adapted for a two-wheel drive front transaxle having an internal combustion engine with a transverse oriented crankshaft for driving a vehicle with front and rear pairs of road wheels, a transmission gear unit for said transaxle including transverse input and output shafts, and right and left laterally extending front axle drive shafts, each said drive shaft having front wheel mounting means on its outboard end mounting said front pair of road wheels, said dual differential assembly comprising; housing means having a laterally extending passage therethrough aligned on a transverse axis, said housing means having first and second differential casings for associated first and second bevel gear differentials, said casings supported in laterally spaced alignment for rotation about said transverse axis, each said first and second differential casing enclosing inboard and outboard side gears in meshing relation with a plurality of planetary pinion gears, each said casing having opposed inboard and outboard axial extensions thereon, each casing extension formed with a through bore aligned on said transverse axis, input gear means on said first casing engaging gear means on said transmission output shaft, first and second side gear shafts aligned on said transverse axis, said first side gear shaft inboard end extending through the bores of said first casing extensions and said second casing inboard extension end connected to said second differential inboard side gear for rotation therewith, said second side gear shaft inboard end extending through said second casing outboard extension bore and connected to said second differential outboard side gear for rotation therewith, an inner constant diameter sleeve concentric about said first side gear shaft having its one end connected to said first differential outboard side gear for rotation therewith and its other end fixed to said second casing for rotation therewith, an outer sleeve concentric about said inner sleeve and having one end connected to said first casing for rotation therewith, said outer sleeve having a longitudinally disposed driving crown gear fixed to its other end for rotation therewith, said crown gear having oppositely facing sides with the side facing said first differential having an outer rim of beveled teeth defining a central annular pocket, a longitudinally extending propeller shaft having a drive cone gear fixed to its forward end, said cone gear having beveled teeth in direct meshing engagement with said driving crown gear beveled teeth, said propeller shaft having its aft end drivingly engaged with a third rear wheel differential, rear axle means interconnecting said pair of rear road wheels to said rear wheel differential, the improvement wherein single viscous fluid clutch means adapted to provide automatic torque transfer between said inner sleeve and said outer sleeve, said clutch means in the form of a concentric outwardly spaced cylindrical drum portion connected between transversely spaced constant diameter sections of said outer sleeve by a pair of radially extending drum end walls, said cylindrical drum portion and said pair of end walls defining a viscous fluid chamber with a portion of said inner sleeve, one of said drum end walls being nested within said crown gear pocket in a compact concentric manner, said cylindrical drum portion having its inner surface formed with internal splines and said inner sleeve portion formed with corresponding external splines, a first set of ring-shaped viscous coupling plates in said chamber having internal splines drivingly connected to said inner sleeve portion external splines, a second set of ring-shaped viscous coupling plates interleaved with said first set of plates having external splines drivingly connected to said cylindrical drum portion internal splines, viscous fluid in said chamber adapted to be sheared in a progressively increasing manner by said plates as the speed difference between said first differential side gears increases as a result of the friction between the road and one pair of road wheels is substantially less than the friction between the road and the remaining pair of road wheels, thereby splitting the inner and outer sleeves transfer torque in a part time on-demand automatic manner governed by the difference in road friction between the front and rear road wheels.

* * * * *